United States Patent [19]

Suortti et al.

[11] 4,031,253

[45] June 21, 1977

[54] PROCEDURE FOR PRESERVING ROOT CROPS BY DEEP FREEZING AND THEIR PEELING

[75] Inventors: Mikko Tapani Suortti; Yrjö Mölkki, both of Espoo; Olavi Elis Nikkilä, Helsinki, all of Finland

[73] Assignees: Mikko Tapani Suortti; Yrjo Malkki, both of Espoo, Finland

[22] Filed: Nov. 3, 1975

[21] Appl. No.: 628,491

[30] Foreign Application Priority Data

Nov. 6, 1974 Finland .............................. 3236/74

[52] U.S. Cl. .............................. 426/482; 426/524; 426/637
[51] Int. Cl.$^2$ .......................................... A23B 7/04
[58] Field of Search .......... 426/478, 481, 482, 524, 426/523, 637, 419

[56] References Cited

UNITED STATES PATENTS

| 2,597,066 | 5/1952 | Chase | 426/482 X |
| 3,600,199 | 8/1971 | Ornbaek | 426/524 X |
| 3,689,282 | 9/1972 | Feinberg | 426/524 X |

*Primary Examiner*—Raymond N. Jones
*Assistant Examiner*—Esther L. Massung
*Attorney, Agent, or Firm*—Toren, McGeady and Stanger

[57] ABSTRACT

The present invention concerns a procedure for preserving fully ripened potatoes and other root crops that have to be peeled, by deep freezing, and their peeling. In accordance with this invention the products to be preserved are preboiled or boiled and deep frozen in unpeeled condition, or alternatively in partly peeled condition, and the peeling proper is carried out after deep freezing.

3 Claims, No Drawings

PROCEDURE FOR PRESERVING ROOT CROPS BY DEEP FREEZING AND THEIR PEELING

The preserving of root crops by deep freezing is nowadays common practice in households as well as on an industrial scale, and the quality of the most common deep frozen goods remains faultless through storage periods even longer than one year. The vegetables to be deep frozen are usually heat treated prior to deep freezing, and it is considered to be the minimum requirement as regards the heat treatment that the peroxidase enzyme present in the plant tissues should be destroyed. This is achieved by means of parboiling, which is followed by the deep freezing of the product. The final boiling is usually only carried out after thawing the goods, in connection with its heating immediately before serving.

The cleaning of the products to be deep frozen, as well as their peeling, if any, is performed prior to parboiling or boiling and deep freezing so that upon thawing the deep frozen products are immediately ready for consumption.

In endeavours to produce deep frozen dishes and their components, difficulties have been encountered in the deep freezing of potatoes and of certain other root crops. They have acquired objectionable flavour and odour defects during the deep freezing, cold storage and thawing. It has furthermore been difficult to maintain a normal consistency of deep frozen potatoes by deep freezing methods of the prior art, which instead result in a watery, disintegrating or tough product. It has only been possible successfully to deep freeze unripened, fresh so-called new potatoes without any appreciable impairment of their quality.

The root crop peeling methods known heretofore are not fully satisfactory either. Peeling by hand in the raw condition requires so much human labour that it is profitable in few cases only when carried out on an industrial scale. Furthermore, the peeling losses are comparatively high, about 20%. When knife drum and grinding peelers are used, the peeling losses may easily be up to 30%, in addition to which the surface or products peeled by grinding remains objectionably rough. In steam and lye peeling machines, the peeling losses are confined to the 10 to 15% level, but the products, after boiling, have a leathery, tough and unattractive surface.

It is moreover a fact that the boiling of potatoes and other root crops carried out on an industrial scale, which is almost without exception carried out in the peeled condition, is not fully satisfactory. This is because boiling in the peeled condition causes remarkable losses of vitamins, mineral substances and flavour-imparting agents. It is partly attributable to the removal, along with the peel, of the layers lying under the peel and partly to dissolving of the above-noted important substances in the water during the boiling step.

In view of eliminating the drawbacks, mentioned, research has been carried out, as a result of which the present invention has emerged. The invention is characterized in that the products to be preserved are preboiled or boiled and deep frozen in the unpeeled condition or, alternatively, in a partly peeled condition and that the peeling proper is performed after the deep freezing.

It has surprisingly been found that fully ripened potatoes and other root crops will keep over prolonged periods, maintaining a very high quality without any observable odour of flavour defects and also with a consistency comparable to that of similar products which have been boiled using the raw material directly before deep freezing. This is partly due to the fact that in the procedure according to the invention the vegetable products are efficiently protected, also during the deep freezing and cold storage, against losses of vitamins, flavour substances and the like, as well as against weight loss, oxidation and attraction of alien odours.

It is moreover possible, owing to the deep freezing treatment, to postpone the peeling treatment of the products to be carried out after cold storage, whereby the peak loads in the preserving factory and in the cold storage facilities experienced during and immediately after the harvesting period are levelled out. The root crop products may then once more be deep frozen for preservation after they have been peeled.

Furthermore, the peeling of the product after boiling and deep freezing, possibly with its superficial layer thawed, considerably reduces the peeling losses compared with the peeling of the raw vegetables. This is because with cautious handling the peel will also partly be detached from the germ depressions without the necessity of carrying the peeling down to the bottom level of such depressions. At the same time, the valuable vitamins, minerals and flavour substances under the peel are preserved in the product. It should also be noted that the surface of products deep frozen and peeled according to this invention does not acquire, in connection with peeling, any leathery coat, which is obtained on mechanical peeling in raw condition.

In view of maintaining a high product quality, it is most appropriate to perform the preboiling, boiling and deep freezing of the product within 0 to 4 months of harvesting. If, however, the boiling and deep freezing operations have to be carried out after a more prolonged time interval, than it is advantageous to remove the germ depression areas or part of the peel, for instance between 0 and 50% of it, prior to boiling and deep freezing.

The invention is described in detail in the following with the aid of examples.

EXAMPLE 1

Potatoes of the Rekord and Saturna varieties were boiled in grinder-peeled and lye-peeled condition, and in unpeeled condition, in steam for 25 min. and subsequently deep frozen and kept in storage at 253 K (−20° C). The potatoes which had been deep frozen in unpeeled condition were peeled after one week's storage by immersing them in warm water in order to thaw the surface and by rubbing the surface layer off manually, whereupon the potatoes were once more deep frozen. One week later the potatoes were thawed in steam and they were heated to serving temperature at the same time. In an organoleptic assessment test performed by a trained group of between 8 and 10 persons, who gave a score from 0 to 4 for consistency, likewise a score from 0 to 4 for odour and a score from 0 to 10 for flavour, the samples under examination were compared with samples that had been boiled immediately before the assessment, using potatoes of the same varieties and from the same cultivation batch which had not been deep frozen. The results are shown in Table 1. As shown, treatment D corresponds to the process of the present invention whereas treatment A represents a control sample. Treatments B and C represent conventional techniques. It is seen that with the process of the present invention, the product obtained gave organoleptic evaluation scores which were comparable to freshly peeled and boiled potatoes whereas the conventional processess produce products which gave scores differing significantly from the product obtained from treatment A.

Table 1

Comparison of boiling and deep freezing procedures in the organoleptic assessment test A - grinder-peeled, boiled in steam, not deep frozen
B - grinder-peeled, boiled in steam, deep frozen
C - lye-peeled at 341 K (68° C)/25 min., boiled in steam, deep frozen
D - boiled in steam with peel, deep frozen, peeled
+ - statistically significant difference from A at 95% level

| Variety | Treatment | Consistency score | Odour score | Flavour score | Total score |
|---|---|---|---|---|---|
| Rekord | A | 3.2 | 3.5 | 7.6 | 14.1 |
| " | B | 2.7+ | 2.9+ | 5.4+ | 11.1+ |
| " | C | 1.9+ | 2.2+ | 4.6+ | 8.7+ |
| " | D | 2.7 | 3.6 | 7.1 | 13.0 |
| Saturna | A | 3.7 | 3.7 | 8.3 | 15.7 |
| " | B | 3.1+ | 3.2 | 7.1+ | 13.3+ |
| " | C | 3.0+ | 2.6+ | 5.7+ | 11.8+ |
| " | D | 3.8 | 3.5 | 7.6 | 14.6 |

Table 2

Keeping quality of potatoes deep frozen with peel, stored at 253 K (−20° C)

A - Reference sample, grinder-peeled, boiled in water, not deep frozen
B - boiled in water with peel, deep frozen, stored 3 months, peeled on the day of assessment
C - boiled in water with peel, deep frozen, peeled and stored frozen for 3 months Variety: Rekord

| Treatment | Consistency score | Odour score | Flavour score | Total score |
|---|---|---|---|---|
| A | 3.5 | 3.8 | 8.1 | 15.4 |
| B | 2.8 | 3.5 | 7.4 | 13.8 |
| C | 3.3 | 3.5 | 7.8 | 14.6 |

EXAMPLE 2

In view of clarifying the keeping in storage of deep frozen potatoes processed according to the invention, they were kept in cold storage both in peeled and unpeeled condition, for three months, packed in polyethylene bags; after the said time the potatoes stored with peel were also peeled in deep frozen condition, and both samples were heated to serving temperature. Organoleptic assessment of the samples and their comparison with a freshly boiled reference sample made of non-deep frozen potatoes revealed no statistically significant differences, as shown in Table 2.

EXAMPLE 3

In order to clarify the extent to which removal of the germ buds may improve the quality of boiled, deep frozen potatoes produced from raw material kept in storage for 6 months, the test series presented in Table 3 was carried out. According to the results, the quality of the deep frozen potatoes improved significantly, compared with the samples boiled and deep frozen with peel and boiled and deep frozen in completely peeled condition, respectively. Moreover, the organoleptically observed quality of the sample did not differ at any statistically significant level from that of the non-deep frozen reference sample. Other test series revealed that boiling in steam in itself caused no such change as is seen in the table.

Table 3

Effect of removal of germ buds on the quality of deep frozen potatoes

A - grinder-peeled, boiled in water, not deep frozen
B - grinder-peeled, boiled in water, deep frozen
C - germ buds removed, boiled in steam, deep frozen, peeled
D - boiled in water, deep frozen, peeled

| Sample | Consistency score | Odour score | Flavour score | Total score |
|---|---|---|---|---|
| A | 3.4 | 3.6 | 8.1 | 15.1 |
| B | 3.3 | 3.2 | 6.3+ | 12.7+ |
| C | 3.3 | 3.5 | 7.7 | 14.4 |
| D | 2.8+ | 3.0+ | 5.9+ | 11.7+ |

EXAMPLE 4

In order to determine the peeling losses incurred in the procedure of the invention, potatoes boiled and deep frozen with peel were peeled in a grinder-peeling drum having on its walls and bottom a roughening consisting of resilient plastic strips. The drum contained water of 273 to 275 K (0° to 2° C) in order to thaw the surface layer of the potatoes, and the peeling time was 2.5 min. During this period the same degree of cleanness was obtained as in the peeling of unboiled potatoes with conventional grinding peelers. The peeling losses were 15.3%, with average mass of one potato, 70 g.

EXAMPLE 5

In order to compare the vitamin and mineral matter losses incurred in the boiling and deep freezing operations with those in conventional procedures, the ascorbic acid and ash contents of samples treated as specified in Table 3 were determined. On the strength of the results presented in Table 4 the keeping quality of both ascorbic acid and mineral substances is considerably better with the procedure of the invention than in the conventional deep freezing method, and it is comparable with that in freshly boiled samples prepared from non-deep frozen raw material.

It is understood that the invention is not confined to the examples presented here, but that the embodiments may vary within the scope of the claims following below. Root crops requiring to be peeled and here understood to be potatoes, carrots, red beets and the like products, and the procedure may thus advantageously be used also for preserving new potatoes by deep freezing, and for their peeling. Preboiling and boiling are understood to mean the heating of the said products in water or steam at 353 to 393 K (80 to 120° C), preferably 373 K (100° C) during 0 to 30 min., depending on the temperature. The deep freezing may furthermore be carried out by any method previously known in itself wherein the product is cooled to 257 K (−16° C) or colder, e.g. to a temperature between 255 and 243 K (between −18° and −30° C).

Table 4

Keeping quality of ascorbic acid and mineral substances

Samples as in Table 3

| Sample | Ascorbic acid, mg/100 g | | | Ash content, % | | |
|---|---|---|---|---|---|---|
| | Pito | Bintje | Rekord | Pito | Bintje | Rekord |
| A | 7.3 | 8.3 | 7.4 | 0.806 | 0.623 | 0.828 |
| B | 6.0 | 6.4 | 5.2 | 0.659 | 0.540 | 0.632 |
| C | 7.6 | 8.5 | 6.8 | 0.845 | 0.601 | 0.786 |

Table 4-continued

| | Keeping quality of ascorbic acid and mineral substances | | | | | |
|---|---|---|---|---|---|---|
| | Samples as in Table 3 | | | | | |
| | Ascorbic acid, mg/100 g | | | Ash content, % | | |
| Sample | Pito | Bintje | Rekord | Pito | Bintje | Rekord |
| D | 7.7 | 8.1 | 6.5 | 0.789 | 0.633 | 0.730 |

What we claim is:

1. In a process for preserving fully ripened potatoes and other root crops requiring peeling by boiling or parboiling followed by deep freezing, the improvement which comprises carrying out the boiling or parboiling and deep freezing while the crops are in the unpeeled state, peeling the crops in the deep frozen state and wherein the germ buds and up to 50% of the peel of the root crop are removed prior to deep freezing.

2. The process of claim 1 wherein the frozen crop is treated to thaw only the outermost skin thereof, the interior of the crop remaining deep frozen and peeling the thus partially thawed crop.

3. The process of claim 2 wherein after peeling, the crop is again deep frozen.

* * * * *